Patented Nov. 27, 1928.

1,693,394

UNITED STATES PATENT OFFICE.

ROBERT LAUGHLIN, OF CHICAGO, ILLINOIS, ASSIGNOR TO BRAND COMPANY, OF CHICAGO, ILLINOIS, A CORPORATION OF ILLINOIS.

BRAKE-LINING COMPOSITION.

No Drawing.   Application filed November 3, 1924.   Serial No 747,689.

This invention relates to friction producing materials and more particularly to such materials adapted for use in connection with brake lining, clutch elements, pulley surfaces, and the like.

The invention has for its principal object the provision of a brake, clutch and pulley compound, which may be readily varied as to tackiness, and which may be readily employed to impregnate the brake lining, clutch and pulley surfacer members and the like.

The invention has for a further object the provision of a material for this purpose which will readily distribute itself over the entire brake lining surface, clutch face and the like as a result of the application of it to a confined portion thereof.

The invention contemplates the provision of a tacky friction producing material in a carrier adapted to produce full, quick penetration of the material being impregnated, and adapted to quickly also pass off after distribution of the material and impregnation has occurred.

The invention contemplates a new product and a new process for producing the same.

A preferred manner of producing the material will first be described and in accordance with it preferred materials will be indicated as the process is described. Two parts of sponge rubber are preferably added to eight parts of linseed oil and the same heated and stirred thoroughly to the melting point of the rubber, say 125° C., the linseed oil acts as a solvent for rubber which is partially dissolved in it and the rubber is also partially broken up by the action of the heat into isoprene for which the linseed oil is also a solvent.

When the mass is thoroughly heated and thoroughly mixed, two parts of an inert wax, such as crude paraffin, are added to serve as an additional solvent for the rubber and to diffuse the linseed oil. After the addition of the wax and its thorough mixture with the earlier included ingredients one part of litharge or other oxidizing agent is incorporated and the agitation is continued without cooling until the oxygen given off by the litharge has been taken up by the oil. This can be determined by observing the color change of the mixture which upon the addition of the litharge assumes a light red or pinkish tint, and then gradually darkens to the color of an old bronze.

When oxidation has progressed to this point one part sulphur and ten parts hard wax tailings are added. The sulphur completes the reaction with the linseed oil and the wax tailings serve as a carrying member to render the entire mixture more fluid. The mass thus produced is cooked for fifteen or twenty minutes, or until the odor of escaping sulphur dioxid is noticed and a conversion of the linseed oil is complete. Thereupon ten parts of rosin is introduced and allowed to melt and mix with the other ingredients. Saponification is now produced by the addition of from two to two and one-half parts of calcium hydroxide slowly introduced in order that too great foaming may not overflow the container.

Just before saponification is complete the mass assumes a dark, nearly black appearance, and the foaming subsides rapidly, producing a material of dough-like consistency with high adherent properties. The temperature is now reduced to between 70° and 80° C. and the mass is thoroughly kneaded for 30 minutes. Thirty parts of wax or petroleum tailings are now added and thoroughly incorporated through prolonged mixing, the temperature being raised meanwhile again to between 120° and 125° C. The resultant mass is then filtered through a coarse wire mesh screen and to 60 parts of the filtrate thirty parts of melted wax or petroleum tailings and thirty parts of carbon tetrachloride are added. This material should be treated in a closed chamber at a temperature of about 70° C. for about an hour, any fumes created being condensed and maintained or returned to the mixture during the agitation.

The resulting product is a liquid, which, upon cooling to room temperature, is placed in suitable containers for distribution to the trade. To apply this material it is only necessary to inject it upon the brake drum or upon the clutch or pulley members. It automatically distributes itself throughout the material to be impregnated.

The carbon tetrachloride acts as a volatile carrier affecting uniform impregnation and then quickly passing off leaving the tacky material in the brake band, clutch member, and the like, to produce greatly increased applied friction. The various hard and soft wax and petroleum tailings above earlier mentioned are varying mixtures of the heavy hydro-carbons belonging to the naphthenes ($C_2H_{2n}$) and the paraffins ($C_nH_{2n+2}$) groups.

It is thought that the invention and many of its attendant advantages will be understood from the foregoing description, and it will be apparent that various changes may be made in the ingredients and steps of the process without departing from the spirit and scope of the invention or sacrificing all of its material advantages.

I claim:

1. A composition for brake linings, clutch members, and the like, comprising a mixture of the following ingredients: rubber sponge, linseed oil, crude paraffin wax, litharge, sulphur, hard wax tailings, rosin, calcium hydroxide, soft wax tailings or petroleum tailings.

2. The process of producing a composition for impregnating brake linings, clutch members and the like which comprises, heating a mixture of sponge rubber and linseed oil to approximately 125 degrees centigrade, adding inert wax thereto, and thereafter adding an oxidizing agent and agitating, without cooling, thereafter adding sulphur and hard wax tailings and heating the mixture from fifteen to twenty minutes, thereafter adding rosin and saponifying the mixture by the addition of calcium hydroxide, reducing the temperature of the mass to substantially between 70 degrees and 80 degrees centigrade and working the same, then adding wax or petroleum tailings while raising the temperature to approximately 120 degrees to 125 degrees centigrade, filtering the resultant mass and adding melted wax or petroleum tailings and carbon tetrachloride and thereafter heating a closed chamber to a temperature of about 70 degrees centigrade for approximately an hour and thereafter permitting the liquid to cool.

ROBERT LAUGHLIN.